United States Patent Office
3,153,546
Patented Oct. 20, 1964

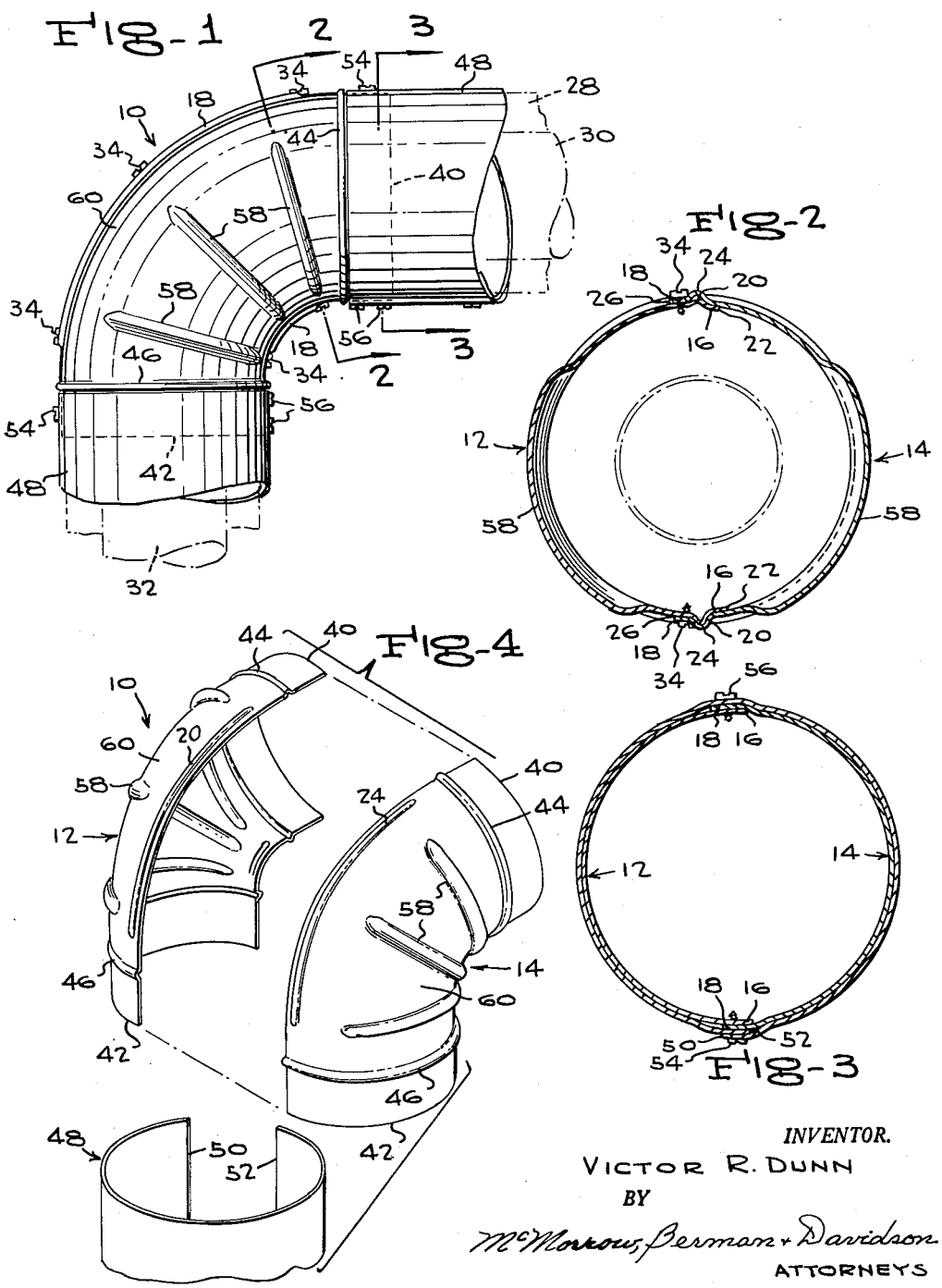

3,153,546
PIPE ELBOW INSULATING JACKET
Victor R. Dunn, P.O. Box 1134, Shreveport, La.
Filed Aug. 22, 1961, Ser. No. 133,250
1 Claim. (Cl. 285—13)

This invention relates to a novel insulating jacket for pipe elbows, and more particularly to a novel and improved split jacket housing.

The primary object of the invention is the provision of a more efficient, more rigid, and stronger split jacket housing of the kind indicated without substantial increase in the manufacturing operations involved or substantial use of additional material.

Another object of the invention is the provision of a jacket housing of the character indicated above, whose sections have overlapping connecting flanges formed with interengageable ribs and grooves whereby the flanges and the sections themselves are properly related, as soon as the ribs and grooves are interengaged, whereby more accurate and more secure connections of the sections together are obtained, preliminary to the threading of securing screws through the connecting flanges.

A further object of the invention is the provision of a jacket housing of the character indicated above, wherein the interengaged ribs and grooves of the connecting flanges constitute reinforcements for the housing, whereby the number of circumferential reinforcing ribs and their circumferential extent can be reduced.

Other important objects and advantageous features of the invention will be apparent from the following description and the accompanying drawings, wherein, for purposes of illustration only a specific form of the invention is set forth in detail.

In the drawings:

FIGURE 1 is a fragmentary side elevation showing two right-angularly related straight pipe-insulating jackets connected by a pipe elbow jacket housing in accordance with the present invention;

FIGURE 2 is a transverse section taken on the line 2—2 of FIGURE 1;

FIGURE 3 is a transverse section taken on the line 3—3 of FIGURE 1; and,

FIGURE 4 is an exploded perspective view showing the sections of the housing separated.

Referring in detail to the drawings, wherein like numerals designate like parts throughout the several views, the illustrated elbow jacket housing, generally designated 10, comprises two similar but reversed first and second sections 12 and 14, respectively, each of slightly more than semi-circular cross section. The excesses along the free edges of the sections provide for overlapped inner connecting flanges 16 on the first section 12, and overlapped outer connecting flanges 18 on the second section 14.

As shown in FIGURE 2, the inner flanges 16 are outwardly formed or indented to provide V-shaped ribs 20 which extend along and are parallel spaced from the free edges 22 of the flanges 16; and the outer flanges 18 are formed or indented to provide V-shaped grooves or channels 24 which extend along and are parallel spaced from the free edges 26 of the outer flanges 18, for conformably receiving the ribs 20 when the housing sections 12 are assembled around a fibrous insulation 28 which is wrapped around a pipe elbow and around angularly related pipes 30 and 32, connected to the elbow, herein illustrated as being disposed at right angles to each other. It will be understood that while the jacket housing 10 is illustrated as covering a 90° pipe elbow, the same can be adapted for covering pipe elbows of other angles.

The overlapped and interengaged connecting flanges 16 and 18 are secured together by means, such as self-threading screws 34, spaced at intervals along these flanges and extended through the free edge portions 26 of the outer flanges 18 and through the inner flanges 16, inwardly of their ribs 20.

As shown in FIGURES 1 and 4, the ribs 20 and grooves or channels 24 do not extend the full lengths of the sections 12 and 14, but extend along curved central sections thereof and terminate with their ends in longitudinally spaced relationship to the ends 40 and 42, respectively, of the sections, and in longitudinally inwardly spaced relationship to out-pressed circumferential grooves 44 and 46, respectively, which are spaced from the ends of the sections. The circumferential grooves 44 and 46 serve as interval moisture traps for condensation occurring within the housing 10, and as stops for the ends of straight jackets 48 which are telescoped upon the ends of the housing 10.

As shown in FIGURE 3, the jackets 48 are split and have their free edges 50 and 52 overlapped and secured together, as by self-threading screws 54, which are threaded through one set of overlapped connecting flanges of the elbow housing sections 12 and 14, and by self-threading screws 56 which are threaded through intermediate portions of the straight jackets and through the other set of overlapped connecting flanges of the housing sections 12 and 14.

The housing sections 12 and 14 are rigidified by means of a small number, here shown as three, of relatively large cross section radially elongated, angularly spaced, out-set concave-convex reinforcing ribs 58, which are formed in the bodies 60 of the housing sections 12 and 14, and terminate, at their ends, in substantially spaced relationship to their connecting flanges. The reinforcing ribs 58 are flared, at their ends, into the section bodies 60, and the ends of the ribs adjacent to the concave sides of the bodies are closer to the connecting flanges thereat than to the connecting flanges at the convex sides of the bodies.

It will be understood from the foregoing that accurate installation of the housing 10 on a pipe elbow, by connecting the sections 12 and 14, is rendered easier and more certain by the fact that the interengagement of the ribs and grooves of the connecting flanges eliminate the trouble and work of having to hold the connecting flanges in accurate alignment and overlap while threading the securing screws therethrough. Further the presence of the interengaged ribs and grooves reinforce the concave wall of the assembled housing 10, and supplements the reinforcing effect of the circumferential ribs 58.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claim appended hereto.

What is claimed is:

A pipe elbow jacket for enclosing a pipe elbow and fibrous insulation about said elbow, the elbow connecting angularly related pipe sections which have insulated jackets thereabout, the elbow jacket comprising:

(a) a body portion of substantially the shape of the pipe elbow including first and second sections, the sections including curved central sections of given lengths;

(b) the first and second sections being of generally semi-circular cross section and having ends and side edges;

(c) overlapping connecting flanges projecting from the side edges;

(d) longitudinally extending, outset ribs of selected lengths on the flanges of one of the sections, the selected lengths of the ribs being less than the respective given lengths of the central sections;

(e) longitudinal grooves of corresponding selected lengths on the flanges of the other of said sections receiving the corresponding ribs of said one section, the sections being snap fit together by engaging the flanges of one section within the flanges of the other section to cause the grooves to interengage with the ribs of said one section;

(f) the respective grooves and ribs being spaced inwardly from the side edges of the sections, and terminating at locations spaced inwardly from the ends;

(g) screw means extending through and securing the flanges together at spaced intervals; and (h) external, circumferential ribs adjacent to and spaced inwardly from the ends providing moisture traps for condensation within the elbow jacket and serving as stops to abut the jackets of the angularly related pipe sections.

References Cited in the file of this patent

UNITED STATES PATENTS

| | | |
|---|---|---|
| 52,520 | Boshert | Feb. 13, 1866 |
| 157,449 | Howell | Dec. 8, 1874 |
| 388,260 | Carey | Aug. 21, 1888 |
| 471,620 | Noble | Mar. 29, 1892 |
| 987,693 | Von Borries | Mar. 28, 1911 |
| 1,324,897 | Holub | Dec. 16, 1919 |
| 1,440,273 | Carman | Dec. 26, 1922 |
| 1,736,492 | Embree | Nov. 19, 1929 |
| 2,650,114 | Epstein | Aug. 25, 1953 |
| 2,650,180 | Walker | Aug. 25, 1953 |
| 2,908,744 | Bollmeier | Oct. 13, 1959 |

FOREIGN PATENTS

| | | |
|---|---|---|
| 774,641 | France | Sept. 24, 1934 |
| 65,989 | Switzerland | Oct. 4, 1913 |

OTHER REFERENCES

Adelta, catalog, 21st and Ellsworth Streets, Philadelphia 24, Pa., September 1956; page 13 only.